(12) United States Patent
Floyd et al.

(10) Patent No.: US 11,050,849 B1
(45) Date of Patent: **\*Jun. 29, 2021**

(54) SYSTEMS AND METHODS FOR VEHICLE CONFIGURATION VERIFICATION USING SMART CONTRACTS

(71) Applicant: State Farm Mutual Automobile Insurance Company, Bloomington, IL (US)

(72) Inventors: Matthew Lewis Floyd, Alpharetta, GA (US); Leroy Luther Smith, Jr., Sandy Springs, GA (US); Brittney Benzio, Atlanta, GA (US); Nathan Barnard, Bloomington, IL (US); Shannon Marie Lowry, Atlanta, GA (US)

(73) Assignee: STATE FARM MUTUAL AUTOMOBILE INSURANCE COMPANY, Bloomington, IL (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/834,937

(22) Filed: Mar. 30, 2020

Related U.S. Application Data

(63) Continuation of application No. 16/026,941, filed on Jul. 3, 2018, now Pat. No. 10,666,767.
(Continued)

(51) Int. Cl.
*H04L 29/08* (2006.01)
*H04W 4/40* (2018.01)
(Continued)

(52) U.S. Cl.
CPC ......... *H04L 67/34* (2013.01); *B60W 50/0205* (2013.01); *B60W 50/029* (2013.01);
(Continued)

(58) Field of Classification Search
CPC . H04L 2209/38; H04L 9/3239; H04L 9/0637; H04L 2209/84; H04L 67/12;
(Continued)

(56) References Cited

U.S. PATENT DOCUMENTS 7,841,010 B2   11/2010   Lerouge et al.
9,132,790 B2 \*  9/2015   Miyake ..................... H04L 9/32
(Continued)

FOREIGN PATENT DOCUMENTS

EP   3283996 A1   2/2018
EP   3316513 A1   5/2018
(Continued)

*Primary Examiner* — Shean Tokuta
(74) *Attorney, Agent, or Firm* — Armstrong Teasdale LLP

(57) ABSTRACT

A computer system for verifying vehicle software configuration may be provided. The computer system may include a processor and a non-transitory, tangible, computer-readable storage medium having instructions stored thereon that, in response to execution by the processor, cause the processor to: (1) retrieve a trusted data block from a memory, the trusted data block including a stored configuration hash value, a smart contract code segment, and a failsafe code segment; (2) generate a current configuration hash value based on at least one software module by executing the smart contract code segment; (3) determine that the current configuration hash value is invalid based on the stored configuration hash value by executing the smart contract code segment; and/or (4) execute the failsafe code segment, in response to determining that the current configuration hash value is invalid.

17 Claims, 12 Drawing Sheets

Related U.S. Application Data

(60) Provisional application No. 62/623,983, filed on Jan. 30, 2018, provisional application No. 62/639,606, filed on Mar. 7, 2018, provisional application No. 62/655,524, filed on Apr. 10, 2018.

(51) Int. Cl.
  B60W 50/029 (2012.01)
  B60W 50/02 (2012.01)
  H04L 9/32 (2006.01)
  B60W 50/04 (2006.01)
  G05D 1/00 (2006.01)

(52) U.S. Cl.
  CPC ......... B60W 50/045 (2013.01); G05D 1/0088 (2013.01); H04L 9/3236 (2013.01); H04L 67/12 (2013.01); H04W 4/40 (2018.02); *B60W 2050/0292* (2013.01); *B60W 2050/046* (2013.01); *G05D 2201/0213* (2013.01)

(58) Field of Classification Search
  CPC ....... H04L 67/34; H04L 9/3236; H04L 67/10; H04L 9/0643; G06F 21/64
  See application file for complete search history.

(56) References Cited

U.S. PATENT DOCUMENTS

| | | | |
|---|---|---|---|
| 9,141,372 B1 * | 9/2015 | Sarkar | G01C 21/32 |
| 9,215,071 B2 | 12/2015 | Billau et al. | |
| 9,536,076 B2 * | 1/2017 | Gajulapalli | B61L 15/0063 |
| 9,607,147 B2 | 3/2017 | Chen et al. | |
| 10,185,553 B2 * | 1/2019 | Annapureddy | G06F 8/654 |
| 10,423,401 B2 * | 9/2019 | Tschache | G06F 8/65 |
| 10,445,493 B2 * | 10/2019 | Suzuki | G06F 21/575 |
| 10,481,896 B2 * | 11/2019 | Rocci | B60L 53/14 |
| 10,666,767 B1 * | 5/2020 | Floyd | G05D 1/0088 |
| 2011/0093701 A1 * | 4/2011 | Etchegoyen | G06F 21/121 |
| | | | 713/165 |
| 2011/0138188 A1 * | 6/2011 | Lee | G06F 21/57 |
| | | | 713/187 |
| 2011/0307336 A1 * | 12/2011 | Smirnov | G06F 8/64 |
| | | | 705/14.62 |
| 2013/0036103 A1 * | 2/2013 | Lawson | G06F 21/64 |
| | | | 707/698 |
| 2013/0073864 A1 * | 3/2013 | Sarkar | G06F 21/64 |
| | | | 713/189 |
| 2015/0026826 A1 * | 1/2015 | Allegri | H04W 12/37 |
| | | | 726/29 |
| 2015/0113520 A1 * | 4/2015 | Kotani | G06F 8/65 |
| | | | 717/172 |
| 2017/0093896 A1 * | 3/2017 | Poornachandran | G06F 21/575 |
| 2017/0147356 A1 * | 5/2017 | Kotary | G06F 3/068 |
| 2018/0006810 A1 | 1/2018 | Ideguchi et al. | |
| 2018/0122237 A1 * | 5/2018 | Nascimento | G08G 1/0965 |
| 2018/0316502 A1 * | 11/2018 | Nadeau | H04L 9/0637 |
| 2019/0146775 A1 * | 5/2019 | Wang | G06F 9/455 |
| | | | 717/169 |
| 2019/0295336 A1 * | 9/2019 | Jones | G07C 5/085 |
| 2020/0007316 A1 * | 1/2020 | Krishnamacharya | |
| | | | H04L 9/3239 |
| 2020/0089487 A1 * | 3/2020 | Ramie | G06F 8/65 |
| 2020/0233950 A1 * | 7/2020 | Assenmacher | G06F 21/44 |

FOREIGN PATENT DOCUMENTS

| | | | | |
|---|---|---|---|---|
| EP | 3445017 A1 * | 2/2019 | | G06F 21/57 |
| WO | 02065258 A2 | 8/2002 | | |

\* cited by examiner

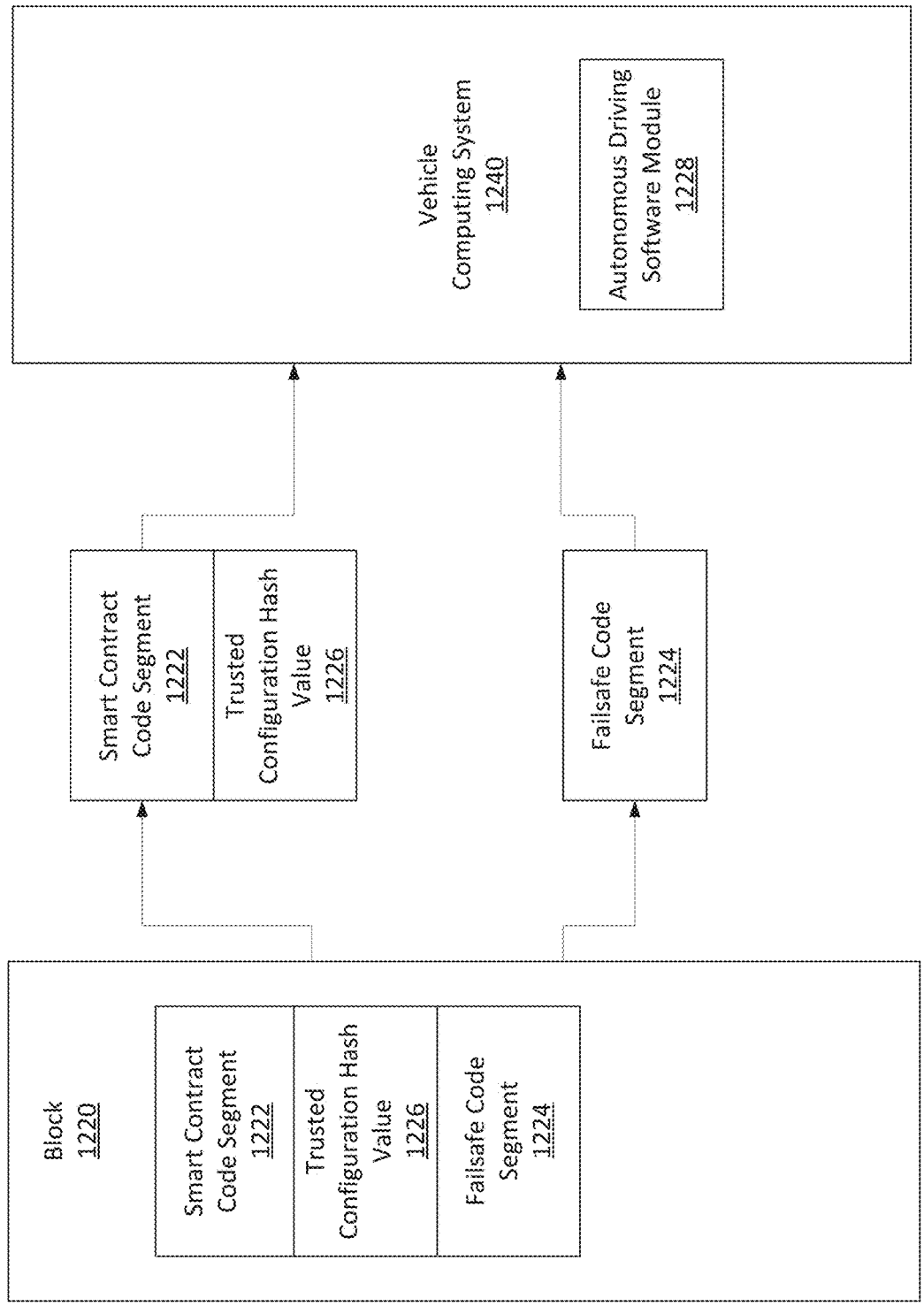

SYSTEMS AND METHODS FOR VEHICLE CONFIGURATION VERIFICATION USING SMART CONTRACTS

CROSS-REFERENCE TO RELATED APPLICATIONS

This application claims priority to and is a continuation of U.S. patent application Ser. No. 16/026,941 filed Jul. 3, 2018, titled "SYSTEMS AND METHODS FOR VEHICLE CONFIGURATION VERIFICATION USING SMART CONTRACTS," which claims the benefit of priority to U.S. Provisional Patent Application No. 62/623,983, filed Jan. 30, 2018, entitled "VEHICLE CONFIGURATION VERIFICATION USING CRYPTOGRAPHIC HASH CHAINS," and U.S. Provisional Patent Application No. 62/639,606, filed Mar. 7, 2018, entitled "VEHICLE CONFIGURATION VERIFICATION USING CRYPTOGRAPHIC HASH CHAINS," and to U.S. Provisional Patent Application No. 62/655,524, filed Apr. 10, 2018, entitled "VEHICLE CONFIGURATION VERIFICATION USING CRYPTOGRAPHIC HASH CHAINS," the entire contents and disclosures of which are hereby incorporated herein by reference in their entirety.

FIELD OF THE INVENTION

The present disclosure relates to computer systems and methods for vehicle configuration verification. More particularly, the present disclosure relates to computer systems and methods for detecting software configuration changes, or lack thereof, on vehicles using block chain data storage and cryptographic hashing.

BACKGROUND

In the automotive industry, vehicles may have a multitude of complex software and firmware components. For example, forward collision detection and air temperature control may be implemented in separate software modules. Vehicle manufactures are increasingly implementing autonomous and semi-autonomous driving functionality and/or introducing additional software modules with critical responsibilities. The safety of some vehicles may now be dependent on the integrity of these software modules.

Existing software verification techniques may be ill-suited for the number of existing vehicles, and possible valid vehicle configurations. For example, during peak times, a highway may have a high flow of vehicles each with a distinct software configuration. Verifying each software module of each vehicle against a centralized database in peak times may be impractical due to processing delays. Additionally, consumers may have a low tolerance for transportation delays.

Conventional software verification techniques may also be ill-suited for verifying vehicle software configurations, and may have several drawbacks, such as being manually intensive, inefficient, annoying, ineffective, and/or time intensive.

BRIEF SUMMARY

The present embodiments relate to systems and methods for vehicle configuration verification and/or unauthorized vehicle modification detection. For example, the systems described herein may receive a vehicle image that includes trusted configurations of vehicle software modules. The systems may calculate a configuration hash value of the software modules, and generate a data block including the configuration hash value. In certain embodiments, the data block may be included in a block-chain, such that the data block includes a hash value of a previous data block. The systems may further store and/or transmit the data block to any number of network participants using a distributed or peer-to-peer network. For example, the systems may transmit the data block to smart roadway systems and/or toll plaza computer systems (and/or other remote servers), such that the configuration of vehicles in use may be validated against the stored vehicle configuration hash values.

In one aspect, a computer system for verifying vehicle software configuration may be provided. In some exemplary embodiments, the computer system may include a processor and a non-transitory, tangible, computer-readable storage medium having instructions stored thereon that, in response to execution by the processor, cause the processor to: (i) retrieve a trusted data block from a memory, the trusted data block including a stored configuration hash value, a smart contract code segment, and a failsafe code segment; (ii) generate a current configuration hash value based on at least one software module by executing the smart contract code segment; (iii) determine that the current configuration hash value is invalid based on the stored configuration hash value by executing the smart contract code segment; and (iv) execute the failsafe code segment, in response to determining that the current configuration hash value is invalid. The computer system may include additional, less, or alternate functionality, including that discussed elsewhere herein.

In another aspect, a computer-implemented method for verifying vehicle software configuration may be provided. In some exemplary embodiments, the method may include: (i) retrieving a trusted data block from a memory, the trusted data block including a stored configuration hash value, a smart contract code segment, and a failsafe code segment; (ii) generating a current configuration hash value based on at least one software module by executing the smart contract code segment; (iii) determining that the current configuration hash value is invalid based on the stored configuration hash value by executing the smart contract code segment; and (iv) executing the failsafe code segment, in response to determining that the current configuration hash value is invalid. The method may include additional, less, or alternate functionality, including that discussed elsewhere herein.

In another aspect, a non-transitory computer-readable storage medium having computer executable instructions embodied thereon may be provided. In some exemplary embodiments, when executed by a computing device including at least one processor coupled to a memory, the computer executable instructions may cause the computing device to: (i) retrieve a trusted data block from a memory, the trusted data block including a stored configuration hash value, a smart contract code segment, and a failsafe code segment; (ii) generate a current configuration hash value based on at least one software module by executing the smart contract code segment; (iii) determine that the current configuration hash value is invalid based on the stored configuration hash value by executing the smart contract code segment; and (iv) execute the failsafe code segment, in response to determining that the current configuration hash value is invalid. The computer-readable storage medium may include additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 12 illustrates a flowchart of another exemplary computer-implemented process implemented by the vehicle computing system shown in FIG. 2 for vehicle configuration validation and/or detecting unauthorized vehicle modification.

Figure 1:
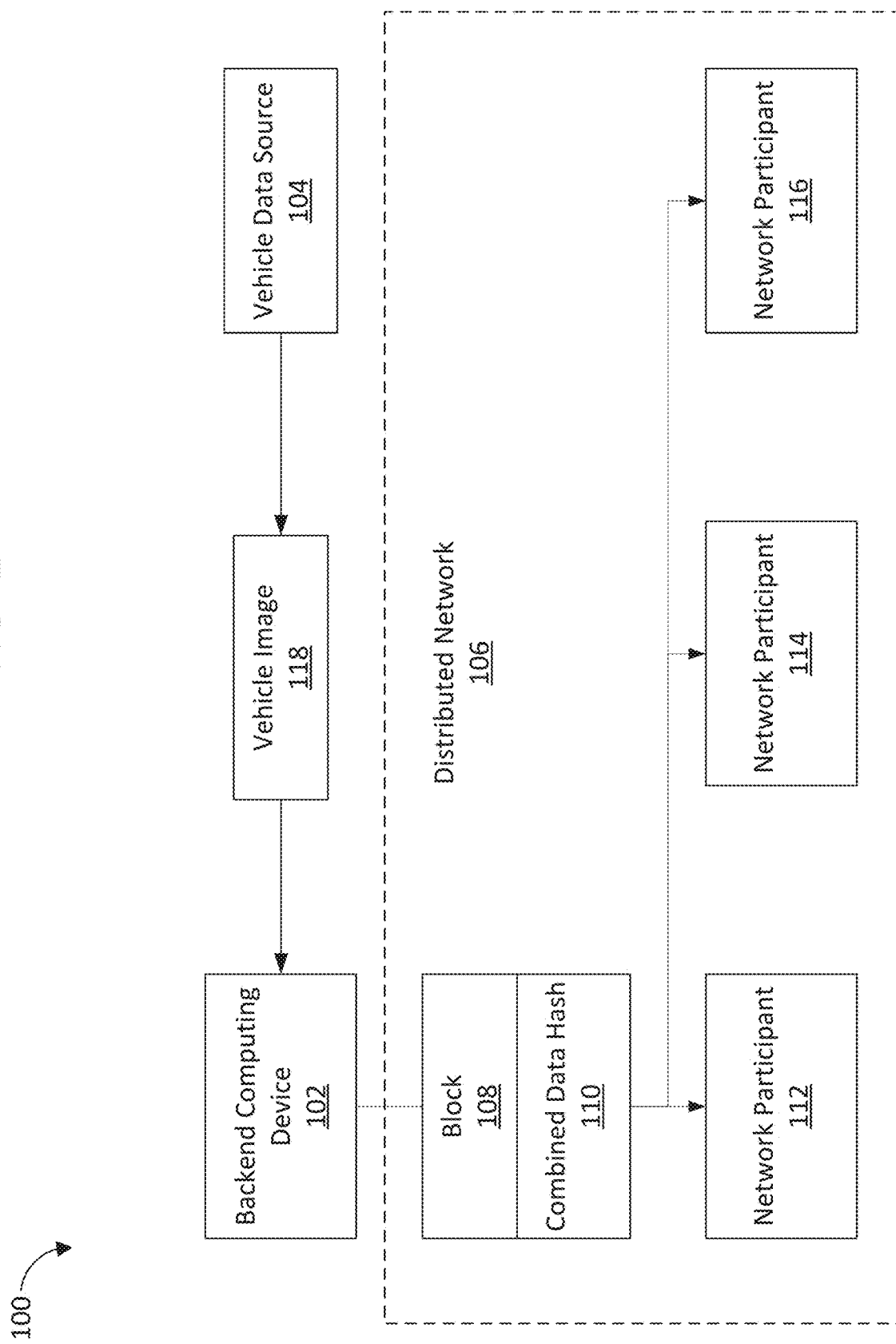
FIG. 1 illustrates a schematic diagram of an exemplary computer system for vehicle configuration validation and/or detecting unauthorized vehicle modification.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for vehicle configuration verification, or alternatively for vehicle software modification detection. In one exemplary embodiment, the process may be performed by a backend system and/or a network participant.

Vehicles increasingly include any combination of software and firmware modules, which may be updated or revised. Certain software modules may be used to implement autonomous or semi-autonomous driving functionality. Additional software modules may perform critical safety features, such as collision detection and automatic breaking. As software assumes responsibility for vehicle operations, these operations become vulnerable to cyber-attacks or hacking, such as maliciously modifying or replacing vehicle software modules. For example, a modified software module may be installed on a vehicle, allowing an unauthorized user to track the vehicle or disable security features.

Software and/or firmware modules may be verified based upon file hashes. However, vehicles may include multiple software modules, which may each be independently developed and/or updated. There is a need for a software validation system capable of handling vehicle software configurations. In various embodiments, a system is provided for generating trusted software configuration hash values based upon trusted vehicle configurations received from manufacturers, or vehicle file system images.

In certain embodiments, the system may include validating the software configuration of vehicles against the trusted software configuration hash values. For example, software validation may be required of vehicles before they may enter a restricted access highway. As another example, software validation may be required before vehicles enable autonomous driving functionality on a smart roadway.

In certain embodiments, a block-chain data structure may be used to store the trusted software configuration hash values. The block-chain data structure may prevent stored hash values from being altered, and/or prevent hash values from being retroactively added. For example, a block-chain data structure may allow the system to detect when a previously stored block has been fraudulently modified, or a block has been retroactively added. In other words, attempts to add hash values corresponding to malicious software may be detected using a block-chain data structure.

In various embodiments, a backend system may receive a vehicle image (e.g., ISO file), including a vehicle identifier and a software module. Overall, the vehicle image defines a trusted configuration of a manufactured vehicle, or set of manufactured vehicles, indicated by the vehicle identifier. The vehicle image may be received from a vehicle or component manufacturer, and may further include a digital signature indicating the source and integrity of the software module. In certain embodiments, the vehicle image may further include a digital signature associated with a regulatory agency, indicating the software has been validated against safety and compliance standards. The vehicle image may include any number of software and/or firmware modules or versions. The modules may include compiled code, or bytecode, configured to be executed by processors integrated into a manufactured vehicle. The vehicle image may include a software version installed on the vehicle, such as a software version for one or more autonomous or semi-autonomous vehicle technologies or systems installed on the vehicle.

Additionally or alternatively, the modules may include interpreted code, configured to be compiled and then executed by a manufactured vehicle. The vehicle identifier may be a VIN number associated with a specific vehicle, a VIN specification associated with a type of vehicle, or any other identifier associated with any number of vehicles.

In various embodiments, the backend system may calculate a configuration hash of the software modules included in the vehicle image. In some embodiments, the backend system generates combined vehicle data based upon the software modules and/or firmware modules included in the vehicle image. For example, the backend system may compress and/or append multiple modules. The backend system is configured to generate a hash value based upon the combined vehicle data and/or vehicle image. The hash value may be configured such that small changes to the input data result in significant changes in the output hash value. For example, deleting or displaying a critical code segment may significantly change a hash value. In one embodiment, the hash value is generated using a secure hash algorithm ("SHA"), such as SHA-2, SHA-3, or SHA-256. Overall, the configuration hash value may be associated with a trusted vehicle configuration, and may be used to detect changes to the vehicle configuration.

In various embodiments, the backend system may generate a data block including the configuration hash value and the vehicle identifier. In certain embodiments, the backend system may generate a data block including multiple configuration hash values and vehicle identifiers. In one embodiment, the data block includes multiple transactions, where each transaction includes a configuration hash value and a vehicle identifier. Overall, the backend system may package at least the configuration hash value and the vehicle identifier as a data block, and further store the data block in a memory. The data block may be stored in a database or directly stored on a storage medium.

In various embodiments, the backend system may append a digital signature to the data block. In some embodiments, the digital signature of the data block may include hash value of the data block, as previously described, and/or a timestamp. For example, the digital signature may be used to verify the authenticity of the data block, and that any vehicle configuration hash value included is a trusted configuration.

In certain embodiments, the data block may be a component of a block-chain data structure, and the data blocks may include an index value. The backend system may be configured to connect a new data block to an existing block-chain, by appending the hash of the previous block to the new block. More specifically, the backend system may retrieve a second data block, and append the hash value of the second data block to the new data block. In one aspect, this allows modification of previous data blocks to be detected.

In certain embodiments, the backend system may be configured to transmit the data block to any number of network participants using a distributed network. The network participants include any number of computer systems that have connected to the distributed network. In certain embodiments, the distributed network may be a peer-to-peer network provided over the internet. In other embodiments, the distributed network may be based upon virtual private network (VPN) connections between network participants. In some embodiments, the backend system transmits the data block to a peer network participant, who may retransmit the data block to additional network participants. In other words, the data block may be added to a distributed digital ledger, where each network participant stores a copy of the digital ledger.

Network participants may be associated with additional vehicles, smart roadway systems, toll plaza systems, vehicle manufacturers, vehicle service centers, vehicle insurers, remote servers, and the like. The network participant may transmit an authentication challenge to the vehicle, and receive an authentication response. The network participant may further compare the authentication response to a vehicle configuration hash value stored in a data block received over the distributed network. In one example, the network participant may be associated with a toll plaza, and may be configured to validate vehicles before allowing passage. In another example, the network participant may be associated with a smart roadway, and configured to validate vehicles traveling on the roadway. In yet another example, the network participant may be a second vehicle, and configured to validate the configuration of nearby vehicles.

In various embodiments, the network participant may be configured to detect and/or identify a vehicle. In some embodiments, the network participant may include a RF interface configured to detect vehicles. In one embodiment, the network participant may detect vehicles based upon RFID tags. For example, a network participant associated with a toll plaza may identify approaching vehicles based upon RFID tags.

In various embodiments, the network participant may be configured to transmit an authentication request to the vehicle computing system, including a hash algorithm specification. For example, the hash algorithm specification may define certain software modules to generate a current hash value for. In various embodiments, the network participant may be configured to receive a current configuration hash value, and a vehicle identifier, in response to the authentication request.

In various embodiments, the network participant may be configured to compare the current configuration hash value to a trusted configuration hash value stored in a data block. More specifically, the network participant may receive an authentication response including a vehicle identifier, and retrieve a trusted configuration hash value from stored data blocks. In certain embodiments, the network participant is configured to transmit the authentication response over the distributed network.

In other words, the network participant may be configured to determine if the current configuration hash value exists in a data block. For example, the network participant may search a block-chain based upon a vehicle identifier to retrieve a trusted configuration hash value. In various embodiments, the network participant may be configured to receive data blocks over the distributed networks, validate the data block based upon a digital signature included in the received data block, and/or then store the received data block in a memory. In one embodiment, the network participant may be associated with a toll plaza, and configured to only allow access after validating a vehicle's configuration. For example, the network participant may activate a vehicle entry barrier in response to validating the vehicle configuration such that the barrier is removed and allows access to the toll-road and/or highway.

Exemplary technical effects of the systems, methods, and computer-readable media described herein may include, for example: (a) receiving a vehicle image including a vehicle identifier and at least one software module; (b) calculating a configuration hash value of the at least one software module; (c) generating a first data block including the configuration hash value, a first index value, the vehicle identifier, and/or a digital signature; (d) storing the first data block in a memory; and/or (e) transmitting the first data block to any number of network participants using a distributed network.

Exemplary System for Vehicle Configuration Validation

As described herein, various system components may be communicatively coupled in any suitable arrangement, such as, for example, via one or more wired and/or wireless connections. Accordingly, although various system components are described herein as capable of wired communication, and/or wireless communications, it will be appreciated that, in various embodiments, such components may communicate in any suitable manner and using any suitable communications protocol, including, for example, combinations of wired and/or wireless communications.

FIG. 1 illustrates a schematic diagram of an exemplary computer system 100 for vehicle configuration validation and/or detecting unauthorized vehicle modification using cryptographic hash chains. More specifically, FIG. 1 illustrates generating a block 108 including a hash 110 based upon a vehicle image 118, such as a vehicle file system image, and transmitting block 108 to any number of network participants. In one exemplary embodiment, system 100 includes backend computing device 102. Backend computing device 102 may be configured to receive vehicle image data, such as vehicle image 118, from a vehicle data source 104. Vehicle data source 104 may be associated with a vehicle manufacturer, a software module developer, and the like. In the exemplary embodiment, vehicle image 118 includes a vehicle identifier (e.g., VIN number), and any number of software modules (e.g., compiled software, object files, source files). In some embodiments, vehicle image 118 may include any number of vehicle identifiers or ranges/patterns of vehicle identifiers. Vehicle image 118 may be compressed or otherwise encoded.

Backend computing device 102 may be configured to generate combined data hash 110 based upon vehicle image 118. In the exemplary embodiment, vehicle image 118 is combined and hashed using a hashing function, such as SHA-3, SHA-2, or MD5. In certain embodiments, backend computing device 102 may be configured to augment vehicle image 118 with a salt value. For example, random data may be appended to vehicle image 118 before the hash value is generated, such that the hash values of identical software are distinct.

In the exemplary embodiment, backend computing device 102 may be configured to generate block 108 including at least combined data hash 110. In alternate embodiments, backend computing device 102 may generate a transaction including data hash 110, and further combine multiple transactions into a block, such as block 108.

Backend computing device 102 may be configured to transmit block 108 to any number of network participants in distributed network 106. In the exemplary embodiment, distributed network 106 is a peer-to-peer network, where network participants retransmit blocks (e.g., block 108) to propagate data across the network. In the exemplary embodiment, distributed network 106 may be a collection of internet-connected devices. Alternatively, distributed network 106 could operate over a private data network and/or virtual private network. In certain embodiments, a network participant 112 may be configured to validate a digital signature of a received data block before storing the data block.

In the exemplary embodiment, distributed network 106 may include at least network participants 112, 114, and 116. Distributed network 106 may include any number and combination of network participants. Backend computing device 102 may be a network participant, and distributed network 106 may include any number of computing devices generating blocks based upon vehicle images. Distributed network 106 may include smart transport devices, such as a smart roadway system, a toll plaza system, remote servers, and additional vehicles.

Figure 2:
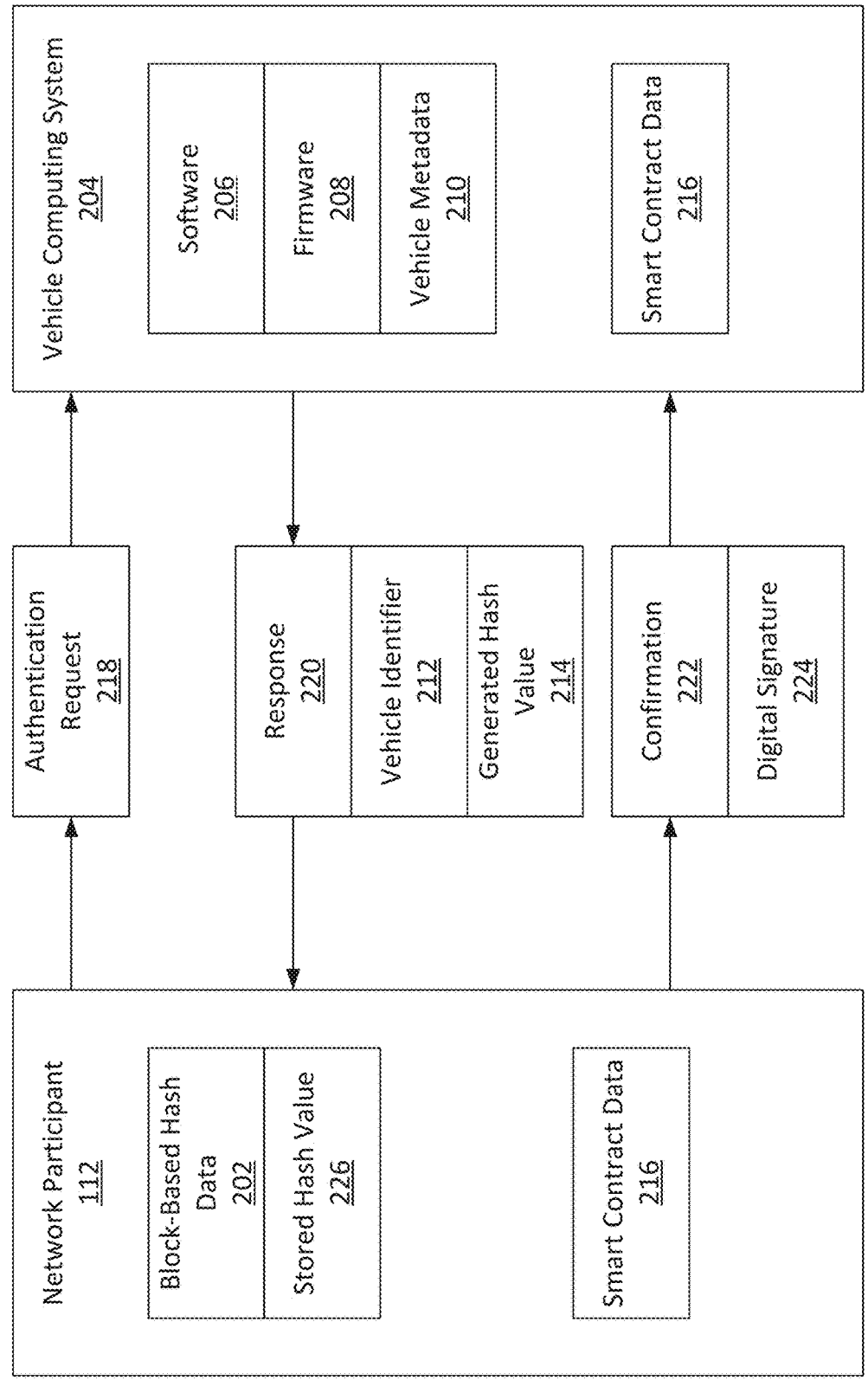
FIG. 2 illustrates a flowchart of an exemplary computer-implemented process implemented by the computer system shown in FIG. 1 for vehicle configuration validation and/or detecting unauthorized vehicle modification.

FIG. 2 illustrates a flowchart of an exemplary computer-implemented process implemented by the computer system shown in FIG. 1 for vehicle configuration validation and/or detecting unauthorized vehicle modification. More specifically, FIG. 2 illustrates authenticating the software configuration of a vehicle computing system 204 based upon hash data 202.

In the exemplary embodiment, network participant 112 may be connected to vehicle computing system 204. For example, vehicle computing system 204 may establish a Bluetooth or Wi-Fi connection with network participant 112. Network participant 112 may be configured to generate and transmit an authentication request 218 to vehicle computing system 204. In one embodiment, authentication request 218 may be a network packet routed to vehicle computing system 204 over a TCP/IP data connection. In another embodiment, authentication request 218 may be a broadcast signal, such as a NFC (near field communications) or RF (radio frequency) signal. For example, network participant 112 may include an RF interface configured to read passive or active RFID (radio frequency identification) tags associated with vehicles. More specifically, network participant 112 may establish a connection with vehicle computing system 204 based upon a vehicle identifier received from a passive RFID tag.

Authentication request 218 may include a specification of the hash type, the software modules to be hashed, and/or a destination (e.g., IP address) to transmit the generated hash to.

In response to authentication request 218, vehicle computing system 204 may be configured to generate a response 220. Response 220 may include, in the exemplary embodiment, vehicle identifier 212 (e.g., VIN number, policy number, etc.), and a generated hash value 214. Vehicle computing system 204 may generate hash value 214 by inputting vehicle software modules (e.g., machine code, object code, source code, compiled code, interpreted code, etc.) to a hash function. For example, vehicle computing system 204 may be configured to generate a hash value based upon software 206, firmware 208, and vehicle metadata 210.

In the example embodiment, vehicle computing system 204 may be configured to retrieve vehicle software modules, combine the vehicle software modules into an input string, and/or generate the hash value using a hash function (e.g., SHA-1, SHA-2, MD5). A generated hash value 214 may be generated such that it is comparable to hash data stored in network participant 112 as block-based hash data 202. For example, authentication request 218 may include a specification of a set of software modules to hash and a hash function equivalent to those used to generate a stored hash value 226. In another example, vehicle computing system 204 may store a default specification of software modules and a hash function.

Network participant 112 may be configured to, in response to receiving response 220, retrieve stored hash value 226. In the exemplary embodiment, network participant 112 may query block-based hash data 202 with vehicle identifier 212 from response 220 to retrieve stored hash value 226. More specifically, block-based hash data 202 may include a key-value store indexed on vehicle identifiers (e.g., VIN numbers).

Network participant 112 may be configured to compare generated hash value 214 to stored hash value 226. Generated hash value 214 represents the current software configuration of vehicle computing system 204, and stored hash value 226 represents a stored and trusted software configuration of vehicle computing system 204. In the exemplary embodiment, network participant 112 may be configured to directly compare hash strings.

Network participant 112 may be configured to generate a confirmation 222 and transmit confirmation 222 to vehicle computing system 204. In the exemplary embodiment, confirmation 222 may include a digital signature 224 indicating that network 112 successfully validated the hash value transmitted by vehicle computing system 204.

In the exemplary embodiment, network participant 112 may include smart contract data 216. Smart contract data 216 may include an electronic or virtual contract associated with a vehicle identifier. In certain embodiments, network participant 112 may be configured to execute a virtual contract based upon authentication response 220 and/or confirmation 222. In some embodiments, smart contract data 216 may include interpreted source code and/or compiled source code. In one embodiment, where vehicle computing system 204 fails verification based upon response 220, smart contract data 216 may include instructions to disable the vehicle and/or enter a safety mode. For example, autonomous or semi-autonomous driving functionality may be disabled. In certain embodiments, smart contract data 216 may be based upon an additional block chain structure.

Exemplary Vehicle Configuration Validation Process

Figure 3:
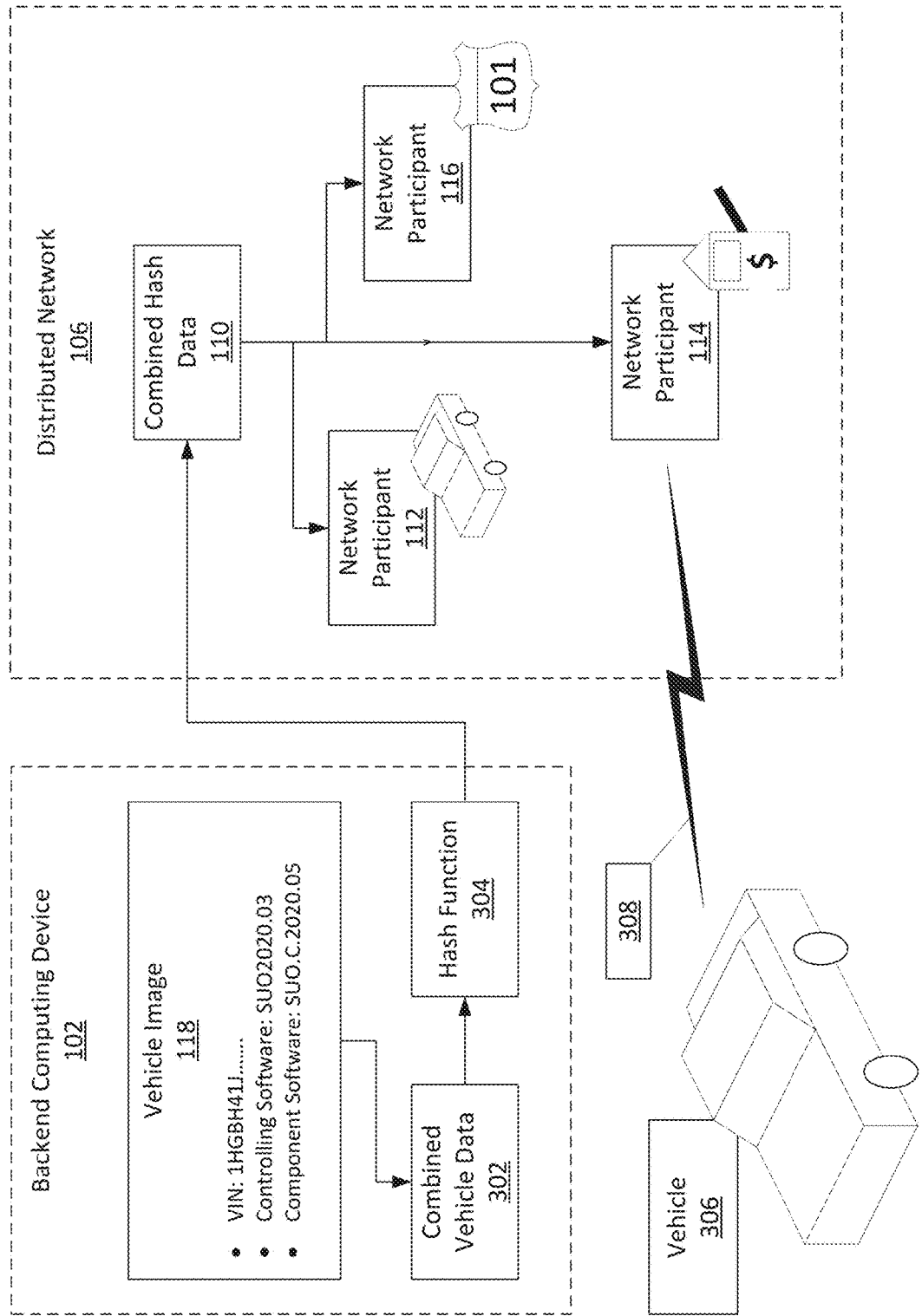
FIG. 3 illustrates a flowchart of another exemplary computer-implemented process implemented by the computer system shown in FIG. 1 for vehicle configuration validation and/or detecting unauthorized vehicle modification.

FIG. 3 illustrates a flowchart of another exemplary computer-implemented process implemented by the computer system shown in FIG. 1 for vehicle configuration validation and/or detecting unauthorized vehicle modification. More specifically, FIG. 3 illustrates backend computing device 102 in communication with distributed network 106, which includes network participants 112, 114, and 116. In the exemplary embodiment, vehicle 306 is being authenticated through network participant 114 and backend computing device 102.

In the exemplary embodiment, backend computing device 102 generates combined vehicle data 302 based upon vehicle image 118. Vehicle image 118 may be received from the manufacturer of vehicle 306, and corresponds to a trusted vehicle software configuration of vehicle 306. For example, vehicle image 118 may be confirmed to meet regulatory and safety standards, and may be a vehicle file system image or the like. Backend computing device 102 may further use combined vehicle data 302 as an input to hash function 304.

Hash function 304 may output a hash value of combined vehicle data 302. For example, hash function 304 may output a string of characters and/or raw byte data. Hash function 304 may be configured such that minor changes to vehicle image 118 and/or combined vehicle data 302 are reflected as significant changes in the output hash value.

In the exemplary embodiment, combined hash data 110 may include the output of hash function 304 and an identifier of vehicle image 118. Backend computing device 102 may be configured to distribute combined hash data 110 to any number of network participants using distributed network 106. In certain embodiments, distributed network 106 may include a block-chain network, as described further in FIG. 7. In the exemplary embodiment, combined data hash 110 is distributed to network participants 112, 114, and 116.

Network participant 112 may be a computing system associated with a police car or other enforcement vehicle or any other authorized vehicle. Network participant 112 may be used to verify the software of a suspect vehicle. For example, a vehicle may be checked for unauthorized software modifications. Network participant 116 may be a component of a smart road computing system. For example, a restricted access highway may be equipped with wireless vehicle interface, such that vehicles operating with corrupted software configurations may be identified.

Network participant 114 may be a component of a toll plaza computing system. For example, network participant 114 may be configured to verify the software configuration of vehicles before allowing access to the tollway. In the exemplary embodiment, vehicle 306 enters the toll plaza associated with network participant 114. Vehicle 306 may generate hash value 308 based upon its current software confirmation, and transmit hash value 308 to network participant 114. Network participant 114 may be configured to compare hash value 308 to combined hash data 110, where combined hash data 110 represents a trusted and/or verified configuration. In certain embodiments, network participant may query combined hash data 110 with a VIN received from vehicle 306 to retrieve a trusted hash value. Network participant 114 may allow access to the toll plaza based upon a successful hash comparison, and alternatively may deny access based upon a failed hash comparison.

Exemplary Computer-Implemented Process

Figure 7:
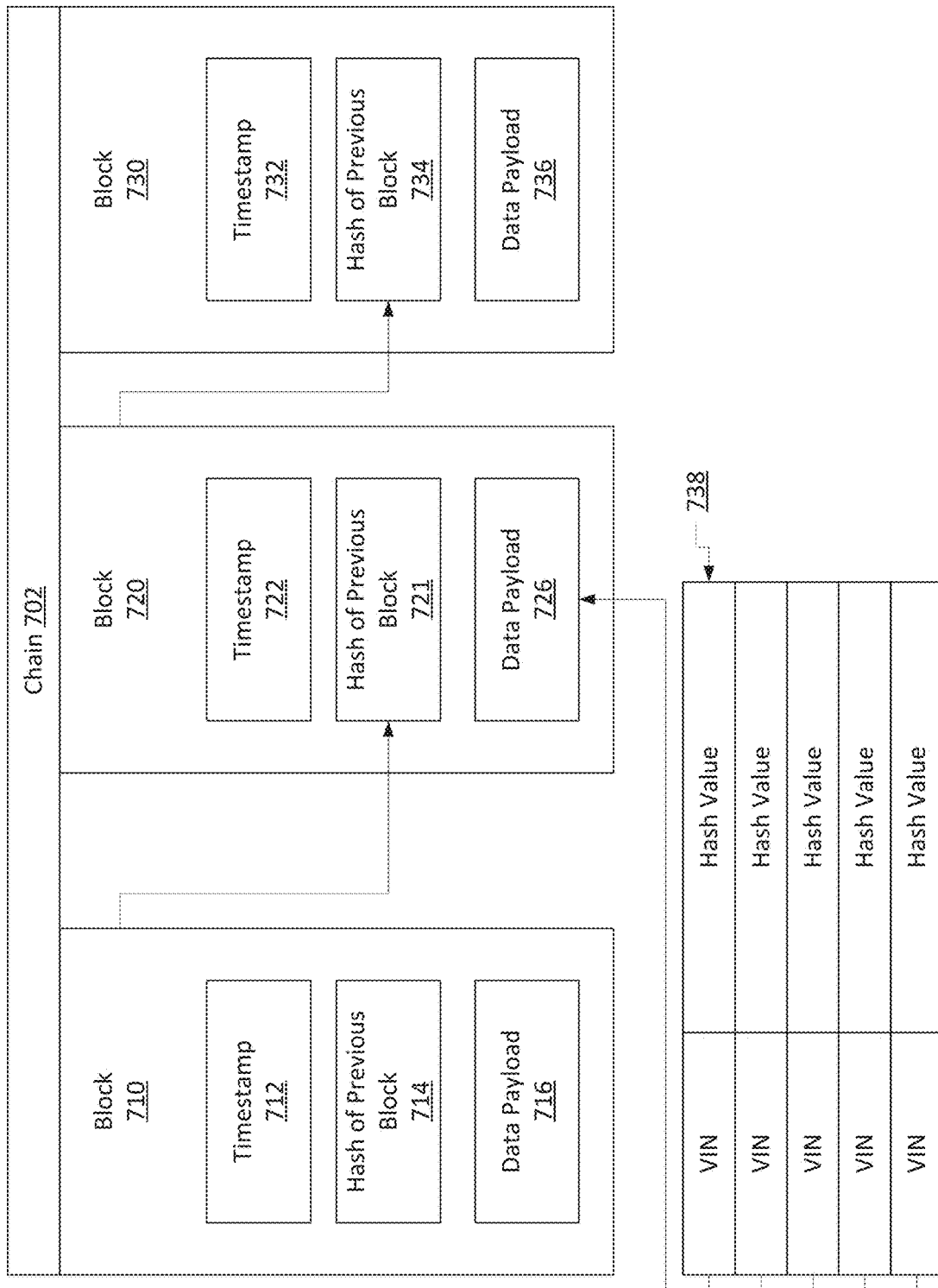
FIG. 7 illustrates a flowchart of another exemplary computer-implemented process implemented by the computer system shown in FIG. 1 for vehicle configuration validation and/or detecting unauthorized vehicle modification.

FIG. 7 illustrates a flowchart of another exemplary computer-implemented process implemented by the computer system shown in FIG. 1 for vehicle configuration validation and/or detecting unauthorized vehicle modification. More specifically, FIG. 7 illustrates storing vehicle configuration hash values and vehicle identifiers in a block-based data structure. In the exemplary embodiment, a block-chain 702 includes, sequentially, block 710, block 720, and block 730. Each block may be linked by incorporating the hash value of the previous block. In some embodiments, new blocks may be added to the chain by retrieving or generating a hash of a previous block, and appending to a newly generated block.

More specifically, block 720 may include the hash of block 710, which is the previous block, as hash of previous block 721. In one aspect, including hash 721 in block 720 prevents block 710 from being modified after the creation of block 720. In certain embodiments, block 720 may further include a digital signature generated by the backend computing device 102 (shown in FIG. 1). Further, Block 730 is after block 720, and thus includes hash 734 of block 720 in addition to data payload 736. Similarly, block 710 may include hash 714 of the proceeding block (not shown) and data payload 716.

In the exemplary embodiment, data block 720 stores multiple vehicle identifiers and trusted vehicle configuration hash values. More specifically, block 720 includes data payload 726, storing hash data 738. Block 720 further may include timestamp 722. In alternate embodiments, block 720 may include an index value. Block 710 includes timestamp 712, and block 730 includes timestamp 732.

Exemplary Client Device

Figure 4:
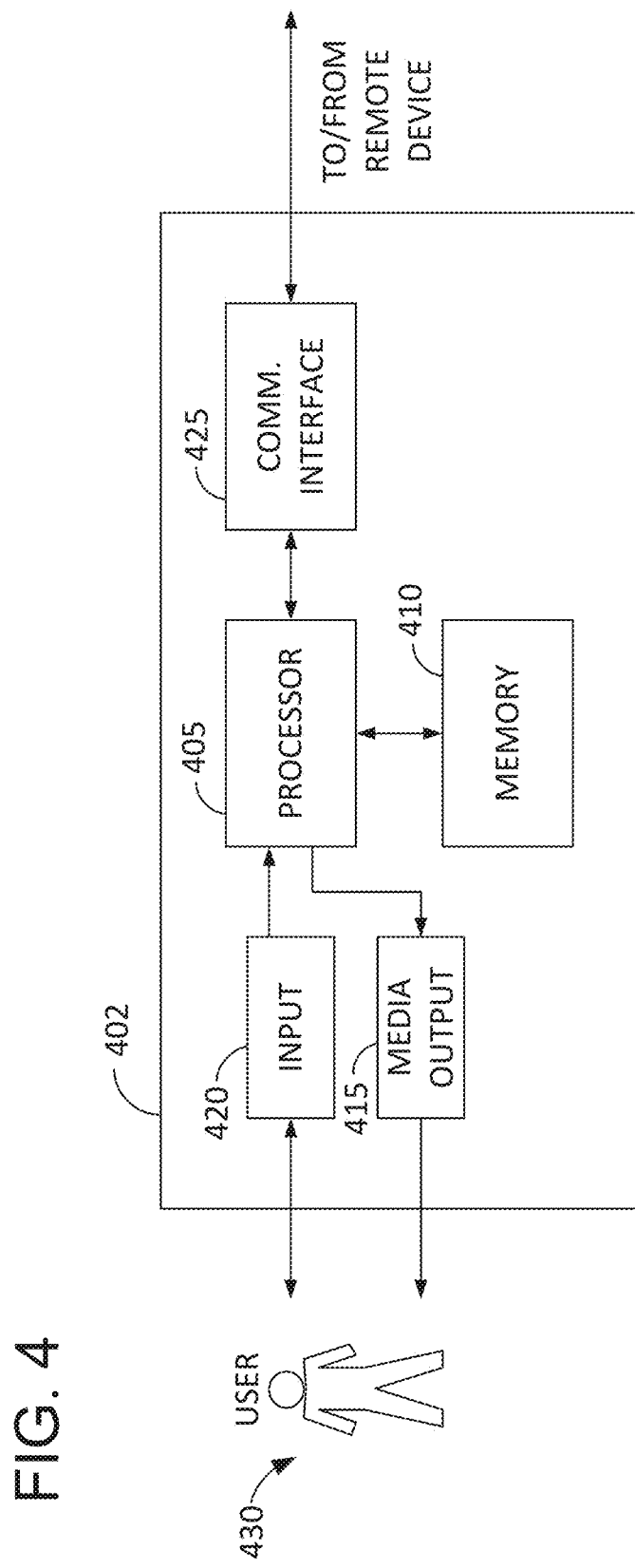
FIG. 4 illustrates an exemplary configuration of a client device shown in FIG. 1, in accordance with one embodiment of the present disclosure.

FIG. 4 depicts an exemplary configuration of a client device 402, such as network participant 112, 114, and/or 116, as shown in FIG. 1, and in accordance with one embodiment of the present disclosure. Client device 402 may be operated by a user 430. Client device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

Client device 402 may also include at least one media output component 415 for presenting information to user 430. Media output component 415 may be any component capable of conveying information to user 430. In some embodiments, media output component 415 may include an output adapter (not shown) such as a video adapter and/or an audio adapter. An output adapter may be operatively coupled to processor 405 and adapted to operatively couple to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 430. A graphical user interface may include, for example, a display interface for viewing and/or generating hash data, and/or enabling authentication of a vehicle computing system based upon a comparison of received hash data with stored/trusted hash data. In some embodiments, client device 402 may include an input device 420 for receiving input from user 430. User 430 may use input device 420 to, without limitation, select and/or enter data, such as, for example, one or more report criteria or report filters.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

Client device 402 may also include a communication interface 425, communicatively coupled via network 106 to backend computing device 102 (shown in FIG. 1). Communication interface 425 may include, for example, a wired or wireless network adapter and/or a wireless data transceiver for use with a mobile telecommunications network.

Stored in memory area 410 are, for example, computer readable instructions for providing a user interface to user 430 via media output component 415 and, optionally, receiving and processing input from input device 420. A user interface may include, among other possibilities, a web browser and/or a client application. Web browsers enable users, such as user 430, to display and interact with media and other information typically embedded on a web page or a website.

Exemplary Database System

Figure 5:
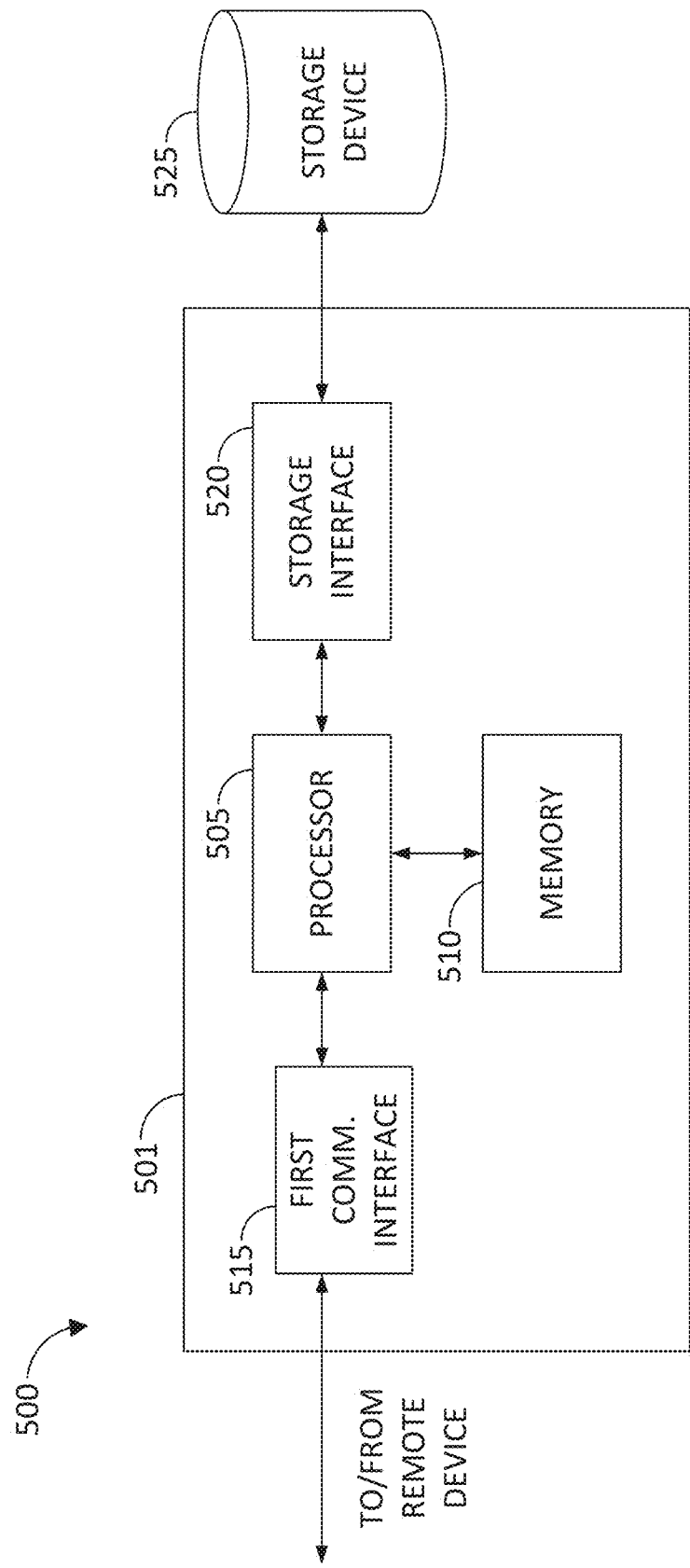
FIG. 5 illustrates an exemplary configuration of a server shown in FIG. 1, in accordance with one embodiment of the present disclosure.

FIG. 5 depicts an exemplary server system 500 such as backend computing device 102, as shown in FIG. 1, and in accordance with one exemplary embodiment of the present disclosure. Accordingly, server system 500 may include a server computer device 501 (e.g., backend computing device 102), which may, in turn, include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote computing device, as described above. For example, communication interface 515 may receive requests from network participant 112 via the Internet and/or over a computer network.

Processor 505 may also be operatively coupled to a storage device 525. Storage device 525 may be any computer-operated hardware suitable for storing and/or retrieving data, such as, but not limited to, data associated with database 520. In some embodiments, storage device 525 may be integrated in server computer device 501. For example, server computer device 501 may include one or more hard disk drives as storage device 525.

In other embodiments, storage device 525 may be external to server computer device 501 and may be accessed by a plurality of server computer devices 501. For example, storage device 525 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Exemplary Processes for Vehicle Configuration Validation

Figure 6:
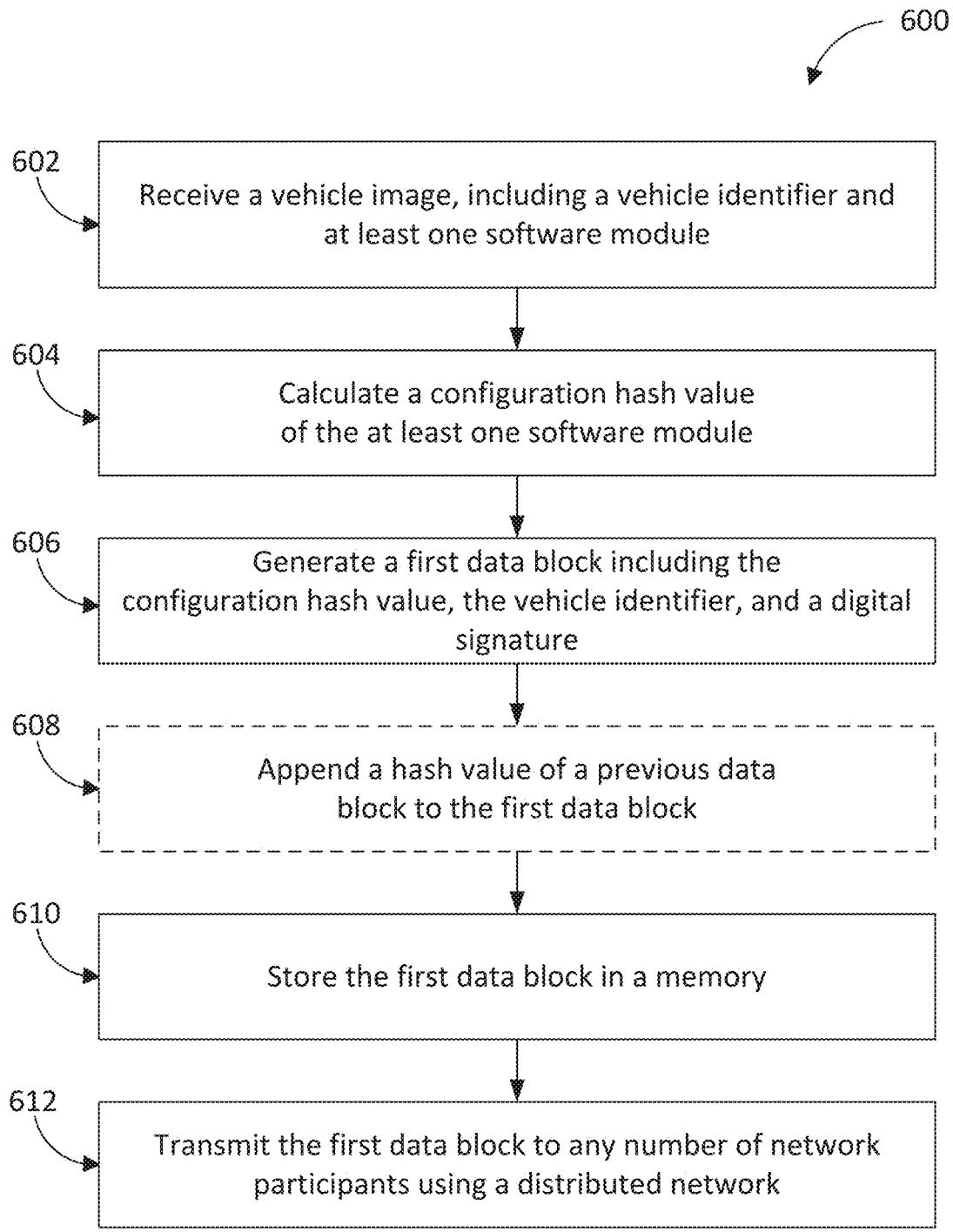
FIG. 6 illustrates a flowchart of another exemplary computer-implemented process implemented by the computer system shown in FIG. 1 vehicle configuration validation and/or detecting unauthorized vehicle modification.

FIG. 6 depicts a flowchart of an exemplary computer-implemented process 600 implemented by computer system 100 (shown in FIG. 1) for verifying a vehicle software configuration and/or detecting unauthorized vehicle configuration modifications. Accordingly, in the exemplary embodiment, system 100 (e.g., backend computing device 102, and/or network participant 112) may receive a vehicle image, including a vehicle identifier and at least one software module (step 602). The image may be received from a vehicle manufacturer and/or software component manufacturer. In addition, in some embodiments, the image may include multiple software modules and/or firmware modules, and an identification of one or more software versions, such as software versions for one or more autonomous or semi-autonomous technologies. For example, the image may include any combination of compiled code (e.g., byte-code, executable code) and/or interpreted code, and/or may be or include a vehicle file system or file configuration image. The vehicle identifier may be a VIN number, a series of VIN numbers, a VIN number prefix, and/or any other vehicle identifier.

System 100 may, in addition, calculate a configuration hash value of the at least one software module (step 604). More specially, backend computing device 102 may generate a configuration hash value based on vehicle image 118, as shown in FIG. 1. In certain embodiments, system 100 may include compressing and/or aggregating the software modules included in the received vehicle image before calculating the hash value. System 100 may generate the configuration hash value using a SHA-type algorithm, such as SHA-256, SHA-2, and/or SHA-3. In certain embodiments, system 100 may generate multiple configuration hash values. The configuration hash value may be defined such that minor changes to the vehicle configuration result in significant changes to the configuration hash value.

System 100 may generate a first data block including the configuration hash value, the vehicle identifier, and a digital signature (step 606). In certain embodiments, the data block includes multiple transactions, each including a hash value and a vehicle identifier. Additionally or alternatively, the data block may include a digital signature and/or hash value of the data block, to facilitate verification of the data block.

System 100 (e.g., backend computing device 102) may, in addition, append a hash value of a previous data block to the first data block (step 608). For example, system 100 may retrieve a second data block from memory, and append a hash value of the second data block to the first data block.

In other words, system 100 may be configured to join the first data block to a block-chain, to prevent modification of stored data-blocks.

System 100 may store the first data block in a memory (step 610). For example, system 100 may store the first data block in a database and/or directly in memory. In certain embodiments, system 100 further transmits the first data block to any number of network participants using a distributed network (step 612). For example, system 100 may transmit the first data block using a peer-to-peer block-chain network over the internet. In another example, system 100 may transmit the first data block to any number of network participants.

Exemplary Embodiments & Functionality

Figure 8:
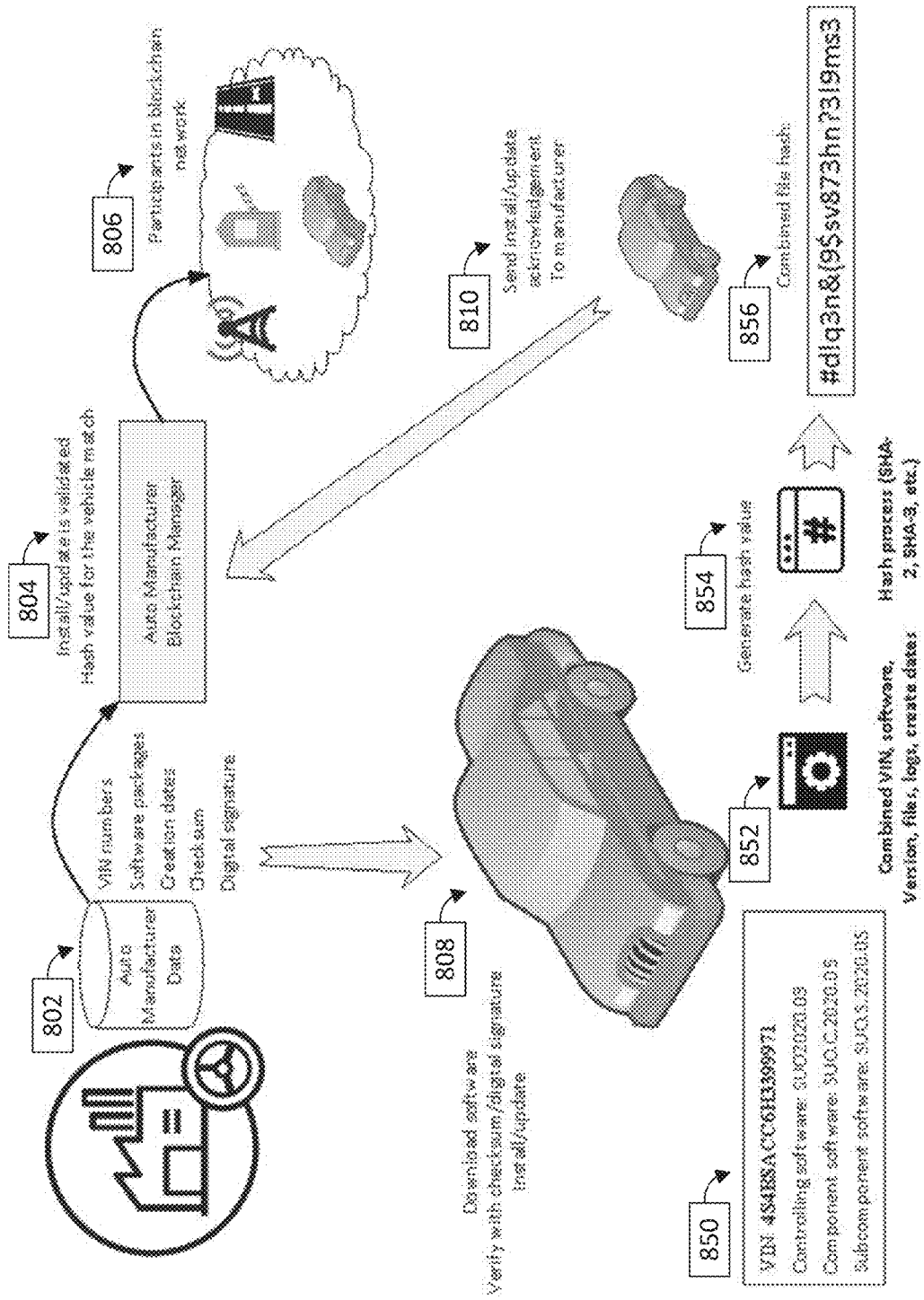
FIG. 8 illustrates a flowchart of an exemplary computer-implemented process implemented by the computer system shown in FIG. 1 for generating trusted hash values associated with vehicle configurations.

FIG. 8 illustrates a flowchart of another exemplary computer-implemented process implemented by the computer system shown in FIG. 1 for generating trusted hash values associated with vehicle configurations. Auto manufacturer data 802 may include VIN numbers, software packages, creation dates, checksums, and digital signatures. In one aspect, vehicle 808 downloads software (e.g., auto manufacturer data 802) from a vehicle manufacturer. For example, vehicle 808 may receive a software update. Vehicle 808 may verify the received software with a checksum and/or digital signature included in auto manufacturer data 802, and then may install the software and/or update the vehicle configuration. In certain embodiments, vehicle 810 may send install/update acknowledgements to auto manufacturer blockchain manager 804.

In another aspect, auto manufacturer blockchain manager 804 retrieves auto manufacturer data 802. In some embodiment, auto manufacturer blockchain manager 804 may simulate the update/install process of vehicle 808. Auto manufacturer blockchain manager 804 is configured to generate a trusted hash value based upon auto manufacturer data 802. For example, a trusted hash value may be used to verify a vehicle configuration. More specifically, auto manufacturer blockchain manager 804 may use vehicle data 850, retrieved from auto manufacturer data 802, to generate combined vehicle data 852. Combined vehicle data 852 may include VIN numbers, software, version data, files, logs, and create dates. Auto manufacturer blockchain manager 804 may generate combined file hash 856 by inputting combined vehicle data 852 to hash process 854 (e.g., SHA-2, SHA-3).

Auto manufacturer blockchain manager 804 may further transmit block data, including auto manufacturer data 802 and/or trusted hash values, to participants in blockchain network 806. In certain embodiments, participants in network 806 may each store received block data, such as trusted hash values and/or auto manufacturer data 802. In some embodiments, vehicle 810 may send install/update acknowledgements to auto manufacturer blockchain manager 804.

Figure 9:
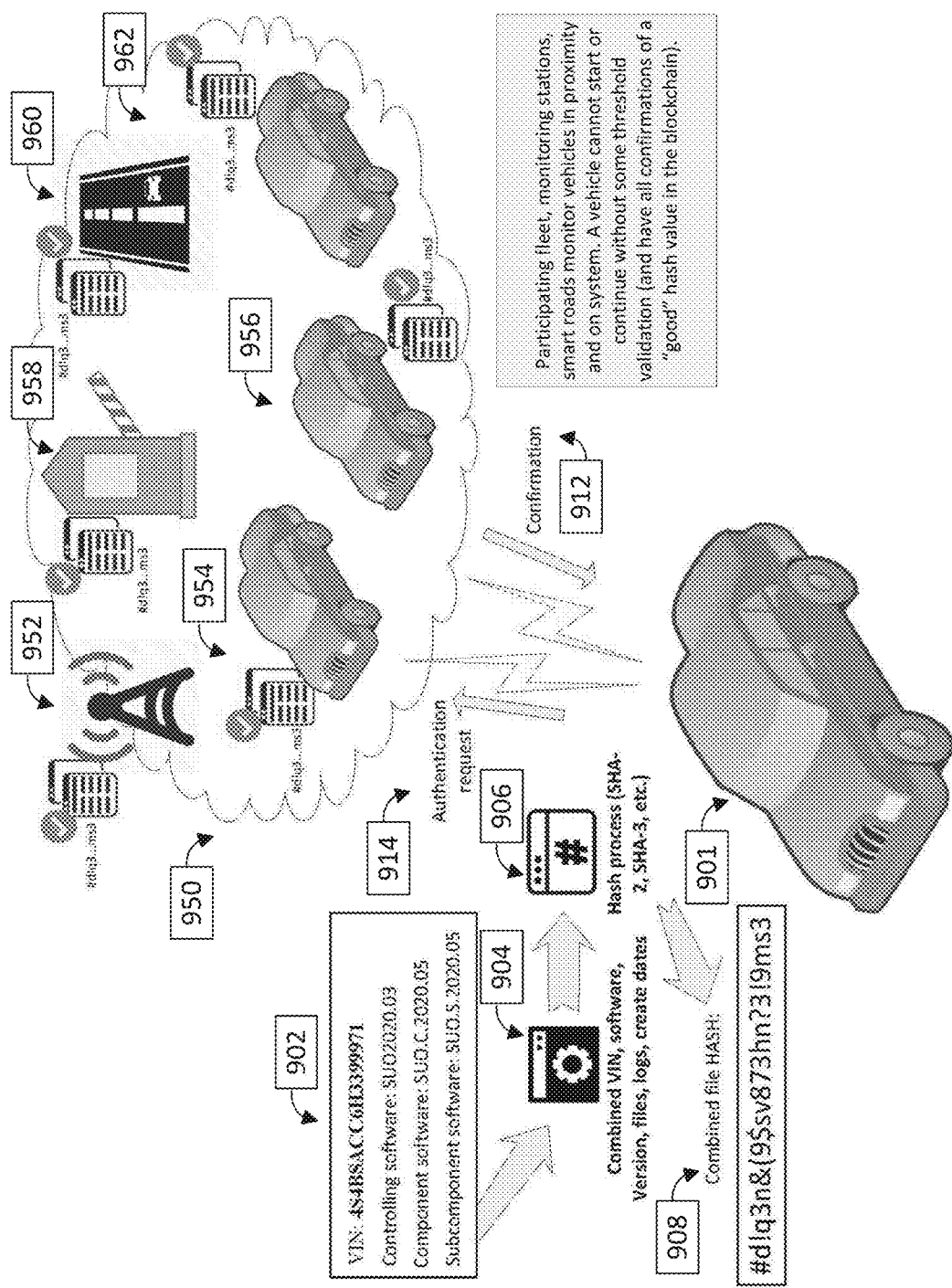
FIG. 9 illustrates a flowchart of another exemplary computer-implemented process implemented by the computer system shown in FIG. 1 for vehicle configuration validation and/or detecting unauthorized vehicle modification.

FIG. 9 illustrates a flowchart of another exemplary computer-implemented process implemented by the computer system shown in FIG. 1 for vehicle configuration validation and/or detecting unauthorized vehicle modification. Vehicle 901 includes vehicle data 902, such as a VIN number, controlling software, component software, and subcomponent software. Vehicle 901 is configured to generate combined vehicle data 904, based upon vehicle data 902. Vehicle 901 further generates combined file hash 908 by inputting combined vehicle data 904 to hash process 906. Combined file hash 908 is based upon the current configuration of vehicle 901.

Vehicle 901 transmits combined file hash 908 to blockchain network 950 in response to authentication request 914. In other words, vehicle 901 may receive authentication request 914 from blockchain network 950, and may respond with combined file hash 908 as evidence of a valid vehicle configuration. For example, vehicle 901 may transmit combined file hash 908 to any member of blockchain network 950, such as vehicle 954 or smart roadway system 960. In the exemplary embodiment, vehicle 901 receives confirmation 912 from blockchain network 950 based upon matching combined file hash 908 to trusted hash data stored by blockchain network 950.

Blockchain network 950 includes any combination of computing systems and/or vehicle systems. Blockchain network 950 may include vehicles 954, 956, and 962. Blockchain network 950 further may include toll plaza computing system 958, smart roadway system 960, and transport monitoring station 952.

The blockchain network 950 may include a participating fleet or fleet of vehicles, monitoring stations, and/or smart roads that monitor vehicles in proximity and within the network or system. In some embodiments, a vehicle cannot start or continue operating without some threshold validation (and have all confirmations of a "good" hash value in the blockchain). Additionally or alternatively, the blockchain may be means of verifying software updates for smart vehicles or autonomous vehicles. The blockchain may be used to verify that a vehicle has the correct software version or an updated software version, or the correct components. If the software version or components (such as sensors or processors) are not validated or authenticated, the vehicle may automatically pull itself over to the side of the road, travel to a dealership for repairs/upgrades, navigating to a predetermined location (such as "home"), and/or have some functionality, such as autonomous functionality, disabled or limited.

Figure 10:
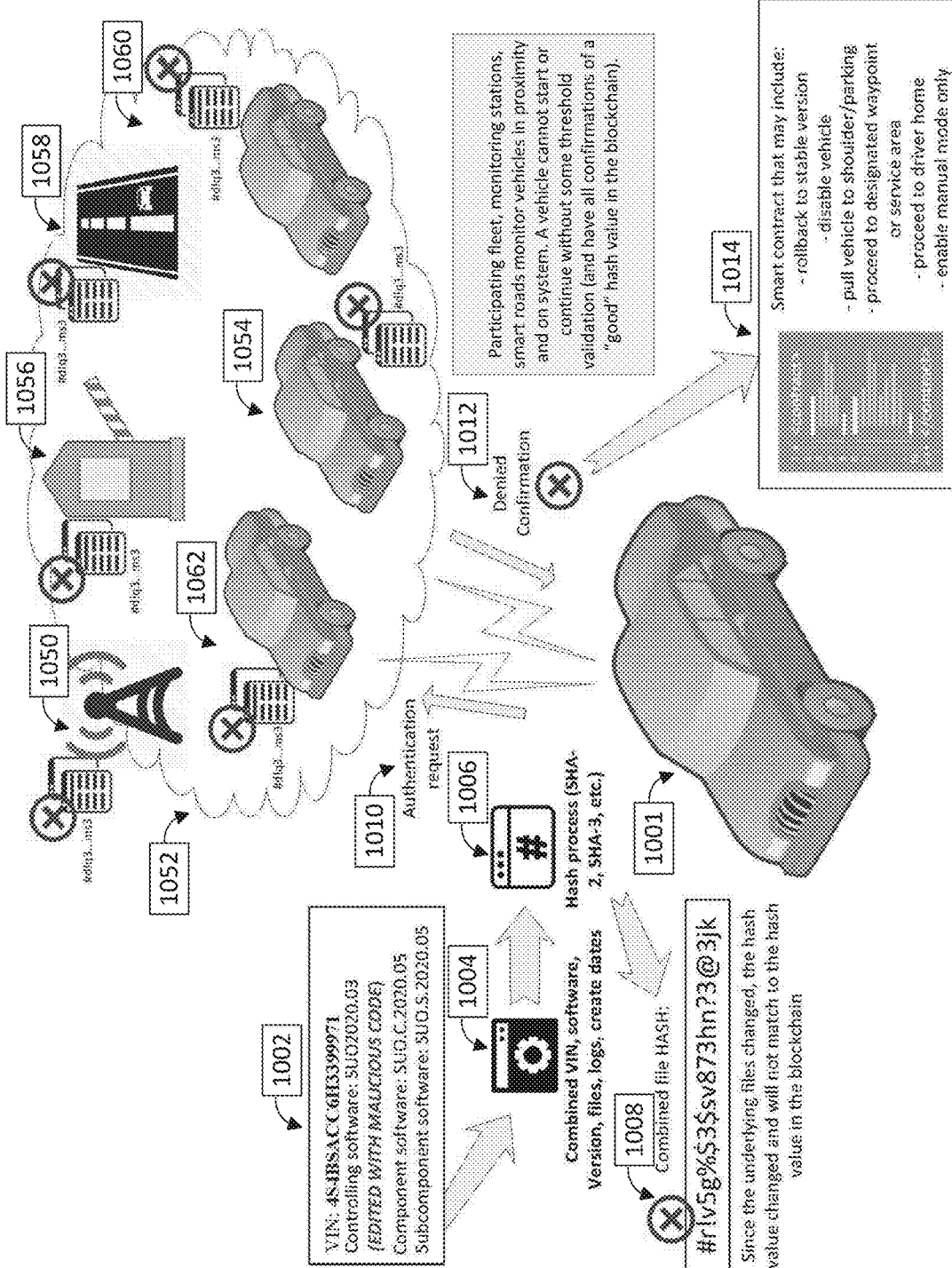
FIG. 10 illustrates a flowchart of another exemplary computer-implemented process implemented by the computer system shown in FIG. 1 for vehicle configuration validation and/or detecting unauthorized vehicle modification.

FIG. 10 illustrates a flowchart of another exemplary computer-implemented process implemented by the computer system shown in FIG. 1 for vehicle configuration validation and/or detecting unauthorized vehicle modification. Vehicle 1001 includes vehicle data 1002. Vehicle data 1002 includes malicious code configured to modify any combination of controlling software, component software, and/or subcomponent software. Vehicle 1001 generates combined vehicle data 1004 based upon malicious vehicle data 1002, and generates hash value 1008 by inputting combined vehicle data 1004 to hash process 1006.

Vehicle 1001 then transmits hash value 1008 to blockchain network 1052, in response to authentication request 1010. Vehicle 1001 receives denied confirmation 1012 because the hash value 1008 was not validated due to the presence of malicious code in vehicle data 1002. More specifically, hash value 1008 may not be recognized by blockchain network 1052, where hash value 1008 is based upon malicious code.

In certain embodiments, blockchain network 1052 may execute smart contract 1014 in conjunction with vehicle 1001. For example, smart contract 1014 may define procedures for denied confirmation. Smart contract 1014 may include, rolling back the configuration of vehicle 1001 to a previously verified configuration, disabling vehicle 1001, causing vehicle 1001 to park, navigating to a predefined location, limiting autonomous driving functionality, and/or disabling autonomous driving functionality.

Blockchain network 1052 includes any combination of computing systems and/or vehicle systems. Blockchain network 1052 may include vehicles 1062, 1054, and 1060. Blockchain network 1052 further may include toll plaza computing system 1056, smart roadway system 1058, and transport monitoring station 1050.

The blockchain network 1052 may include a participating fleet or fleet of vehicles, monitoring stations, and/or smart roads that monitor vehicles in proximity and within the network or system. In some embodiments, a vehicle cannot start or continue operating without some threshold validation. For instance, the blockchain may be used to verify software updates for smart vehicles or autonomous vehicles. The blockchain may be used to verify that a vehicle has the correct software version or smart or other components, such as sensors. If the software version or components are not validated or authenticated, the vehicle may take one or more corrective actions, such as automatically pulling itself over to the side of the road, traveling to a dealership for repairs/upgrades, navigating to a predetermined location (e.g., the owner's location), and/or have some functionality, such as autonomous functionality, disabled or limited if that can be done safely.

Figure 11:
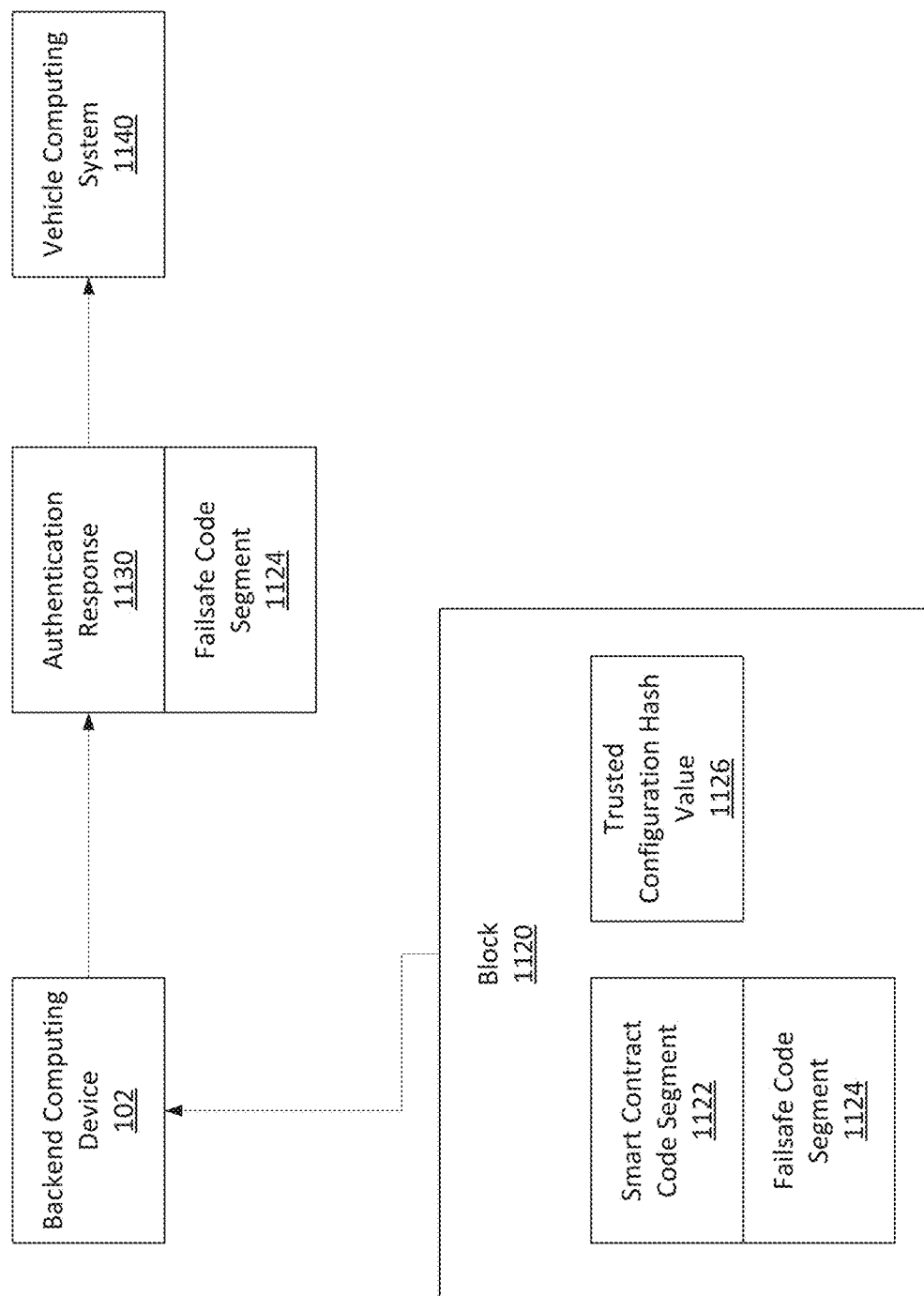
FIG. 11 illustrates a flowchart of another exemplary computer-implemented process implemented by the computer system shown in FIG. 1 for vehicle configuration validation and/or detecting unauthorized vehicle modification.

FIG. 11 illustrates a flowchart of another exemplary computer-implemented process implemented by the computer system shown in FIG. 1 for vehicle configuration validation and/or detecting unauthorized vehicle modification. Backend computing device 102 (shown in FIG. 1) is configured to execute smart contract code segment 1122. In the example embodiment, smart contract code segment 1122 is stored in block 1120 which may be an element of a blockchain data structure, as shown in FIG. 7. Backend computing device 102 may execute smart contract code segment 1122 in response to receiving an authentication request, as shown in FIG. 2. More specifically, smart contract code segment 1122 may be used to generate authentication responses, such as authentication response 1130.

Smart contract code segment 1122 is configured to determine that a current configuration hash value received from vehicle computing system 1140 is invalid based on trusted configuration hash value 1126 stored in block 1120, as shown in FIG. 2.

In response to determining the current configuration hash value is invalid, smart contract code segment 1122 may be configured to generate authentication response 1130 including failsafe code segment 1124. Failsafe code segment 1124 may be stored within smart contract code segment 1122 as a sub-module. Additionally or alternatively, failsafe code segment may be stored in block 1120.

Failsafe code segment 1124 is configured to be executed by vehicle computing system 1140. In one embodiment, failsafe code segment 1124 is configured to disable at least one autonomous driving functionality provided by vehicle computing system 1140. For example, autonomous highway steering may be disabled. As another example, all driving functionality may be disabled. In another embodiment, failsafe code segment 1124 may include a failsafe destination, and be configured to cause vehicle computing system 1140 to autonomously navigate to the failsafe destination, such as a parking lot, service center, or vehicle storage location.

In some embodiments, failsafe code segment 1124 may be configured to revert software and/or firmware configuration changes. For example, the most recent software configuration change may be revered. More specifically, failsafe code segment 1124, when executed by vehicle computing system 1140, may remove and/or modify invalidated software modules. In one embodiment, vehicle computing system 1140 may remove a software module having an invalid current configuration hash value. In another embodiment, vehicle computing system 1140 may modify a software module having an invalid current configuration hash value using a trusted configuration hash value. For example, a previous software configuration associated with the trusted configuration hash value may be loaded. In other words, a backup configuration may be loaded, where the backup configuration has a trusted configuration hash value.

Backend computing device 102 is configured to transmit authentication response 1130 to vehicle computing system 1140, such that vehicle computing system 1140 is able to execute failsafe code segment 1124 and carry out the instructions included within the failsafe code segment 1124.

FIG. 12 illustrates a flowchart of another exemplary computer-implemented process implemented by the vehicle computing system shown in FIG. 2 for vehicle configuration validation and/or detecting unauthorized vehicle modification. In the example embodiment, vehicle computing system 1240 stores block 1220 in a blockchain data structure, as shown in FIG. 7. Block 1220 includes smart contract code segment 1222, trusted configuration hash value 1226, and failsafe code segment 1224. More specifically, smart contract code segment 1222 may include trusted configuration hash value 1226 and failsafe code segment 1224.

Vehicle computing system 1240 is configured to execute smart contract code segment 1222, to compare a current configuration hash value to trusted configuration hash value 1226. The current configuration hash value may be generated based on any combination of software and firmware modules stored by vehicle computing system 1240, as shown in FIG. 3.

Vehicle computing system 1240 may execute failsafe code segment 1224 in response to determining the current configuration hash value is invalid using smart contract code segment 1222. In the example embodiment, failsafe code segment 1224 is stored in block 1220 and is configured to be executed by vehicle computing system 1240.

When executed by vehicle computing system 1240, failsafe code segment 1124 causes one or more processors to perform operations including: (i) instructing autonomous driving software module 1228 to navigate to a predefined destination, such as a service center; (ii) autonomously exit a smart roadway, such as a roadway limited to autonomous vehicles; (iii) modify one or more configuration changes included in the invalidated software module, such that the current configuration invalided hash value matches a trusted configuration hash value; (iv) disable one or more software modules, such as autonomous driving software module 1128; and (v) disable vehicle computing system 1240.

Further Exemplary Embodiments & Functionality

In one aspect, a computer system for verifying vehicle software configuration may be provided. In some exemplary embodiments, the computer system may include a processor and a non-transitory, tangible, computer-readable storage medium having instructions stored thereon that, in response to execution by the processor, cause the processor to: (i) retrieve a trusted data block from a memory, the trusted data block including a stored configuration hash value, a smart contract code segment, and a failsafe code segment; (ii) generate a current configuration hash value based on at least one software module by executing the smart contract code segment; (iii) determine that the current configuration hash value is invalid based on the stored configuration hash value by executing the smart contract code segment; and/or (iv) execute the failsafe code segment, in response to determining that the current configuration hash value is invalid.

In some embodiments, the smart contract further includes a failsafe destination. The failsafe code segment may be configured to cause the vehicle computing system to autonomously navigate to the failsafe destination. In another embodiment, the failsafe code segment may be further configured to cause the vehicle computing system to generate a route to the failsafe destination not including smart roadways. In another embodiment, the failsafe code segment may be configured to modify the at least one software module in response to determining that the current configuration hash value is invalid.

In yet another embodiment, the failsafe code segment may be configured to cause the vehicle computing system to modify the at least one software module until the current vehicle configuration hash value matches a fallback configuration hash value included in the smart contract. In another embodiment, the failsafe code segment may be configured to disable at least one autonomous driving functionality on the vehicle computing system. In another embodiment, the failsafe code segment may be further configured to cause the vehicle to exit a smart roadway before disabling autonomous driving functionality.

In another aspect, a computer system for vehicle configuration verification, and/or detecting unauthorized vehicle modification may be provided. In some exemplary embodiments, the computer system may include a processor and a non-transitory, tangible, computer-readable storage medium having instructions stored thereon that, in response to execution by the processor, cause the processor to perform operations including: (i) receiving a vehicle image, including a vehicle identifier and at least one software module; (ii) calculating a configuration hash value of the at least one software module; (iii) generating a first data block including the configuration hash value, a first index value, the vehicle identifier, and/or a digital signature; (iv) storing the first data block in a memory; and/or (v) transmitting the first data block to any number of network participants using a distributed network. The computer system may include additional, less, or alternate functionality, including that discussed elsewhere herein.

The vehicle image may include at least one compiled code module and at least one interpreted source code module. In other words, the vehicle image may include both compiled source code and/or interpreted source code that is stored on the vehicle for controlling operations of the vehicle. In one embodiment, the source code module, compiled source code, and/or interpreted code may relate to autonomous or semi-autonomous vehicle technologies, systems, or components, and/or may include a version identifier of the software or code. Additionally or alternatively, the vehicle image may include a digital signature of the last least one source code module, and the processor may be further configured to validate the vehicle image based upon the digital signature. The vehicle identifier may be a VIN number and/or define a subset of VIN numbers.

In certain embodiments, the processor may be configured to perform operations including: (i) retrieve a second data block from the memory; (ii) calculate a previous block hash value based upon the second data block; and/or (iii) append the previous block hash value to the first data block. In some embodiments, the data block may include any number of configuration hash values and associated vehicle identifiers. In one embodiment, the processor may be configured to calculate the configuration hash value using a SHA-2 type hash algorithm.

In another aspect, a computer system for vehicle configuration verification, and/or detecting unauthorized vehicle modification may be provided. In some exemplary embodiments, the computer system may include a processor and a non-transitory, tangible, computer-readable storage medium having instructions stored thereon that, in response to execution by the processor, cause the processor to perform operations including: (i) transmitting an authentication request to a vehicle computing system including a hash algorithm specification; (ii) receiving a current configuration hash value and a vehicle identifier; (iii) retrieving a second data block from the memory based upon the vehicle identifier; (iv) comparing the current configuration hash value to the stored configuration hash value included in the second data block; and/or (v) transmitting an authentication response to the vehicle computing system based upon the comparison, including a digital signature. The computer system may include additional, less, or alternate functionality, including that discussed elsewhere herein. In certain embodiments, the processor may be further configured to transmit the authentication response to any number of computer systems using a distributed network.

In certain embodiments, the processor is further configured to perform operations including: (i) receiving a first data block using a distributed network including a configuration hash value, a second vehicle identifier, and/or a digital signature; (ii) validating the first data block based upon the digital signature; and/or (iii) storing the first data block in a memory.

In some embodiments, the computer system may further include a RF interface, where the processor may be further configured to detect vehicles based upon receiving a vehicle identifier. In one embodiment, the computer system may be configured to use the RF interface to receive vehicle identifiers from active or passive RFID tags.

In some embodiments, the data block further may include a smart contract associated with a vehicle identifier, where the smart contract includes interpreted code. The processor may be configured to execute the smart contract based upon the authentication response. For example, the computer system may be configured to disable a vehicle entry barrier based upon comparing the current configuration hash value to a stored configuration hash value. In other words, a computer system associated with a toll plaza may allow access to a highway after validating a vehicle.

The smart contract may further include a failsafe code segment, and the authentication response may be configured to cause a vehicle computing system to execute the failsafe code segment. In one embodiment, the failsafe code segment includes disabling autonomous driving functionality. In another embodiment, the failsafe code segment includes configuring the vehicle to autonomously navigate to a failsafe destination. The failsafe code segment may include instructions to avoid and/or route around smart roadways. In yet another embodiment, the failsafe code segment may include a fallback configuration hash value, and may cause the vehicle to rollback recent software configuration changes until the current vehicle configuration hash value matches the fallback configuration hash value. For example, recently installed software modules may be removed and/or disabled.

In another aspect, a computer system for verifying vehicle software configuration may be provided. In some exemplary embodiments, the computer system may include a processor and a non-transitory, tangible, computer-readable storage medium having instructions stored thereon that, in response to execution by the processor, cause the processor to perform operations including: (i) transmitting, to a vehicle computing system, an authentication request including a hash algorithm specification; (ii) receiving, from the vehicle computing system, a current configuration hash value and a vehicle identifier; (iii) retrieving a trusted data block from a memory based upon the vehicle identifier, the trusted data block including a stored configuration hash value and a smart contract code segment; (iv) executing the smart contract code segment, the smart contract code segment including a failsafe code segment; and/or (v) transmitting the authentication response to the vehicle computing system, thereby causing the vehicle computing system to execute the failsafe code segment. The smart contract code segment, when executed by the one or more processors, may facilitate: (i) determining that the current configuration hash value is invalid based on the stored configuration hash value; and/or (ii) generating an authentication response including the failsafe code segment, the authentication response configured to cause the vehicle computing system to execute the failsafe code segment.

In yet other embodiments, the smart contract may further include a failsafe destination. The failsafe code segment may be configured to cause the vehicle computing system to autonomously navigate to the failsafe destination. In other embodiments, the failsafe code segment is further configured to cause the vehicle computing system to generate a route to the failsafe destination not including smart roadways. In other embodiments, the failsafe code segment is configured to revert one or more configuration changes made to the vehicle computing system.

In some embodiments, the failsafe code segment is configured to cause the vehicle computing system to revert software changes until a current vehicle configuration hash value matches a fallback configuration hash value included in the smart contract. In other embodiments, the failsafe code segment is configured to disable at least one autonomous driving functionality on the vehicle computing system. In other embodiments, the failsafe code segment is further configured to cause the vehicle to exist a smart roadway before disabling autonomous driving functionality.

Additionally, the present embodiments may include computer systems or computer-implemented methods that provide discounts on auto insurance or other insurance cost savings to vehicles or vehicle owners having, or associated with, the risk mitigation functionality and actions discussed herein. For instance, vehicle owners having vehicles equipped or configured with the software verification techniques and vehicle control features discussed herein, including the functionality related to corrective actions and/or disabling unsafe autonomous vehicles or vehicle features, may receive insurance discounts or other types of rewards to facilitate encouraging risk averse behavior and computer systems.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A vehicle computer system for verifying software stored on a vehicle computing system of a vehicle, the vehicle computing system comprising:
a processor; and
a non-transitory, tangible, computer-readable storage medium having computer-executable instructions stored thereon that, in response to execution by the processor, cause the processor to:
retrieve a trusted data block from a memory, the trusted data block including a stored configuration hash value, a smart contract code segment, and a failsafe code segment;
generate, by executing a smart contract code segment, a current configuration hash value to determine whether the current configuration hash value is invalid; and
execute a failsafe code segment, in response to determining that the current configuration hash value is invalid.

2. The vehicle computer system of claim 1, wherein the smart contract code segment further includes a failsafe destination, and wherein the failsafe code segment is configured to:
cause the vehicle computing system to autonomously navigate to the failsafe destination; and
cause the vehicle computing system to generate a route to the failsafe destination not including smart roadways.

3. The vehicle computer system of claim 1, wherein the failsafe code segment is configured to:
modify at least one software module in response to determining the current configuration hash value is invalid; and
cause the vehicle computing system to modify the at least one software module until the current configuration hash value matches a fallback configuration hash value included in the smart contract code segment.

4. The vehicle computer system of claim 1, wherein the failsafe code segment is configured to:
disable at least one autonomous driving functionality on the vehicle computing system; and
cause the vehicle to exit a smart roadway before disabling autonomous driving functionality.

5. The vehicle computer system of claim 1, wherein the smart contract code segment is executed to determine that the current configuration hash value is invalid based on the stored configuration hash value.

6. A computer-implemented method for verifying software stored on a vehicle computing system of a vehicle, the method implemented using the vehicle computing system having one or more processors, said method comprising:
retrieving a trusted data block from a memory, the trusted data block including a stored configuration hash value, a smart contract code segment, and a failsafe code segment;
generating, by executing the smart contract code segment, a current configuration hash value of software stored on the vehicle computing system to determine whether the current configuration hash value is invalid; and
executing the failsafe code segment, in response to determining that the current configuration hash value is invalid.

7. The method of claim 6, wherein the smart contract code segment further includes a failsafe destination, and wherein the failsafe code segment is configured to:
cause the vehicle computing system to autonomously navigate to the failsafe destination; and
cause the vehicle computing system to generate a route to the failsafe destination not including smart roadways.

8. The method of claim 6, wherein the failsafe code segment is configured to:
modify at least one software module in response to determining the current configuration hash value is invalid; and
cause the vehicle computing system to modify the at least one software module until the current configuration hash value matches a fallback configuration hash value included in the smart contract code segment.

9. The method of claim 6, wherein the failsafe code segment is configured to:
disable at least one autonomous driving functionality on the vehicle computing system; and
cause the vehicle to exit a smart roadway before disabling autonomous driving functionality.

10. The method of claim 6, wherein the smart contract code segment is executed to determine that the current configuration hash value is invalid based on the stored configuration hash value.

11. A non-transitory computer-readable storage medium having computer-executable instructions embodied thereon, wherein when executed by a vehicle computer device including at least one processor coupled to a memory, the computer-executable instructions cause the vehicle computer device to:
retrieve a trusted data block from a memory, the trusted data block including a stored configuration hash value, a smart contract code segment, and a failsafe code segment;
generate, by executing the smart contract code segment, a current configuration hash value based on at last one software of software stored on the vehicle computer device to determine whether the current configuration hash value is invalid; and
execute the failsafe code segment, in response to determining that the current configuration hash value is invalid.

12. The computer-readable storage medium of claim 11, wherein the smart contract code segment further includes a failsafe destination, and wherein the failsafe code segment is configured to:
cause the vehicle computer device to autonomously navigate to the failsafe destination; and
cause the vehicle computer device to generate a route to the failsafe destination not including smart roadways.

13. The computer-readable storage medium of claim 11, wherein the failsafe code segment is configured to:
   modify at least one software module in response to determining the current configuration hash value is invalid; and
   cause the vehicle computer device to modify the at least one software module until the current configuration hash value matches a fallback configuration hash value included in the smart contract code segment.

14. The computer-readable storage medium of claim 11, wherein the failsafe code segment is configured to:
   disable at least one autonomous driving functionality on the vehicle computer device; and
   cause a vehicle associated with the vehicle computer device to exit a smart roadway before disabling autonomous driving functionality.

15. The vehicle computer system of claim 1, wherein the smart contract code segment is executed to generate the current configuration hash value based on at least one software module.

16. The method of claim 6, wherein the smart contract code segment is executed to generate the current configuration hash value based on at least one software module.

17. The computer-readable storage medium of claim 11, wherein the smart contract code segment is executed to generate the current configuration hash value based on at least one software module.

* * * * *